US012578875B2

(12) United States Patent　　　　(10) Patent No.:　US 12,578,875 B2
Lazo et al.　　　　　　　　　　　　(45) Date of Patent:　　Mar. 17, 2026

(54) DEVICE INTERNAL DATA PREPARATION AND MIGRATION

(71) Applicant: SK Hynix NAND Product Solutions Corp., Rancho Cordova, CA (US)

(72) Inventors: Vincent Lazo, San Dimas, CA (US); Guangming Lu, Irvine, CA (US); Jason Molgaard, Windsor, CO (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/789,265

(22) Filed: Jul. 30, 2024

(65) Prior Publication Data

US 2026/0037141 A1　　Feb. 5, 2026

(51) Int. Cl.
　　*G06F 3/06*　　　　　(2006.01)
(52) U.S. Cl.
　　CPC .......... *G06F 3/0619* (2013.01); *G06F 3/0659* (2013.01); *G06F 3/0679* (2013.01)
(58) Field of Classification Search
　　CPC ..... G06F 3/0619; G06F 3/0659; G06F 3/0679
　　See application file for complete search history.

(56) References Cited

U.S. PATENT DOCUMENTS

| | | | |
|---|---|---|---|
| 2002/0170015 | A1 | 11/2002 | Hornung et al. |
| 2006/0039196 | A1 | 2/2006 | Gorobets et al. |
| 2007/0233890 | A1* | 10/2007 | Valadon ............ H03M 13/2714 |
| | | | 709/231 |
| 2011/0292807 | A1* | 12/2011 | Shah ..................... H04W 24/02 |
| | | | 370/235 |

| | | | |
|---|---|---|---|
| 2015/0312078 | A1* | 10/2015 | Bogdan ................ H04L 7/0087 |
| | | | 375/226 |
| 2015/0334210 | A1* | 11/2015 | Hughes ............... H04L 63/0428 |
| | | | 370/474 |
| 2017/0286477 | A1 | 10/2017 | Morley et al. |
| 2020/0168253 | A1* | 5/2020 | Shah ..................... G06K 7/1417 |
| 2021/0042870 | A1* | 2/2021 | De Corte ............. G06Q 10/083 |
| 2021/0158841 | A1 | 5/2021 | Liu et al. |
| 2023/0104752 | A1 | 4/2023 | Cariello |

OTHER PUBLICATIONS

SK Hynix NAND Product Solutions Corp. (dba Solidigm), PCT/US2025/038963, International Search Report and Written Opinion, Nov. 18, 2025, 8 pgs.

* cited by examiner

*Primary Examiner* — Hiep T Nguyen

(74) *Attorney, Agent, or Firm* — Morgan, Lewis & Bockius LLP

(57)　　　　　　ABSTRACT

This application is directed to preparing and processing data locally in a memory system that includes a data processor, a memory controller, and a non-volatile memory (e.g., NAND flash memory). The memory system obtaining a request for processing first data. A modified form of the first data has been stored as second data in the non-volatile memory. The memory system identifies the second data stored in the non-volatile memory, and extracts the second data from the non-volatile memory. The second data is processed by the memory controller of the memory system to recover the first data, which are further provided to the data processor for processing locally within the memory system. In some embodiments, the memory controller temporarily stores the second data in a first memory and the recovered first data in a second memory from which the data processor extracts the recovered first data for further local on-memory processing.

20 Claims, 7 Drawing Sheets

Figure 2:
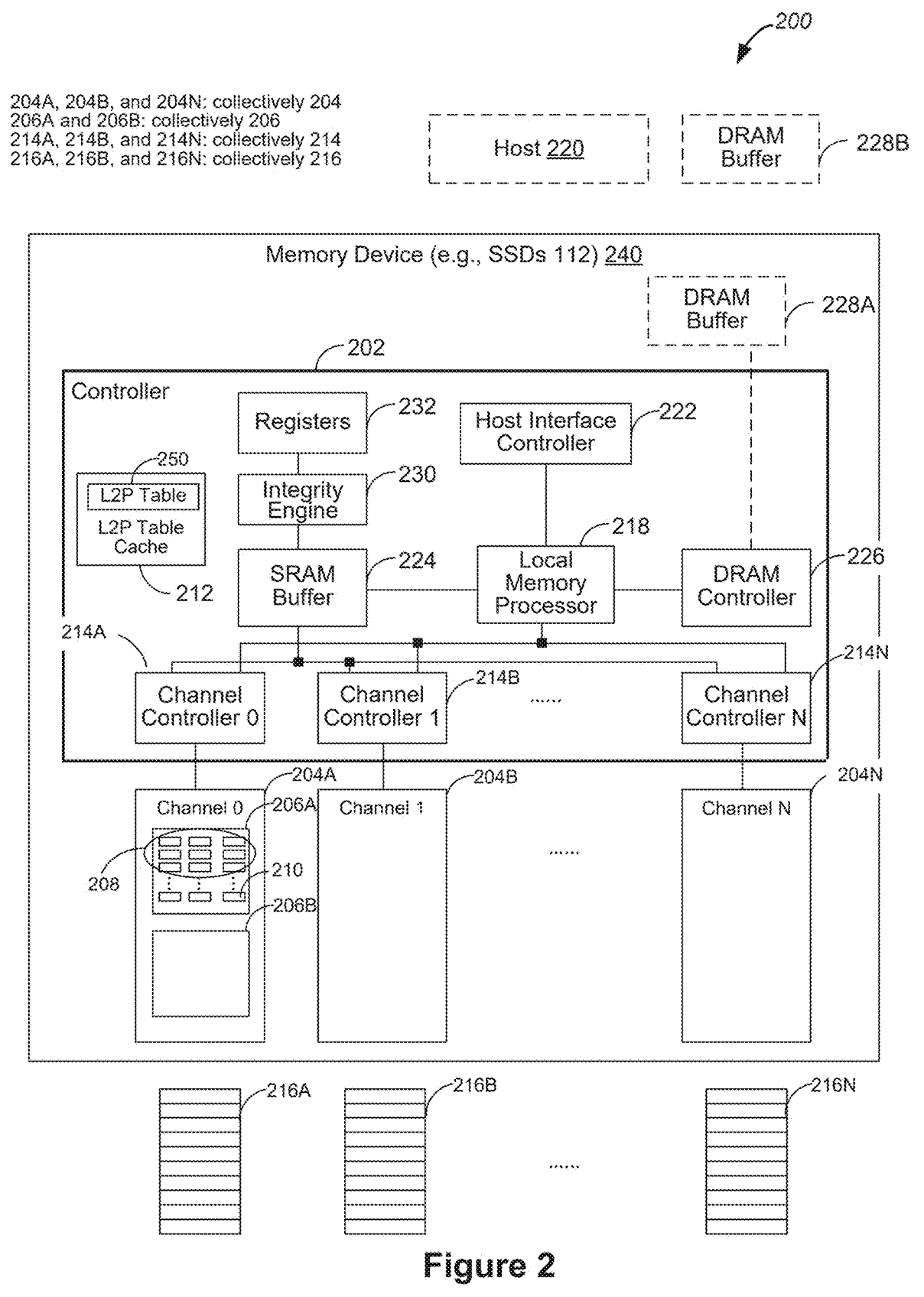

200

204A, 204B, and 204N: collectively 204
206A and 206B: collectively 206
214A, 214B, and 214N: collectively 214
216A, 216B, and 216N: collectively 216

Host 220

DRAM Buffer — 228B

Memory Device (e.g., SSDs 112) 240

DRAM Buffer — 228A

202

Controller

Registers — 232

Host Interface Controller — 222

250

L2P Table

L2P Table Cache

Integrity Engine — 230

218

212

SRAM Buffer — 224

Local Memory Processor

DRAM Controller — 226

214A

214N

Channel Controller 0

Channel Controller 1 — 214B

......

Channel Controller N

204A

204B

204N

Channel 0 — 206A

Channel 1

Channel N

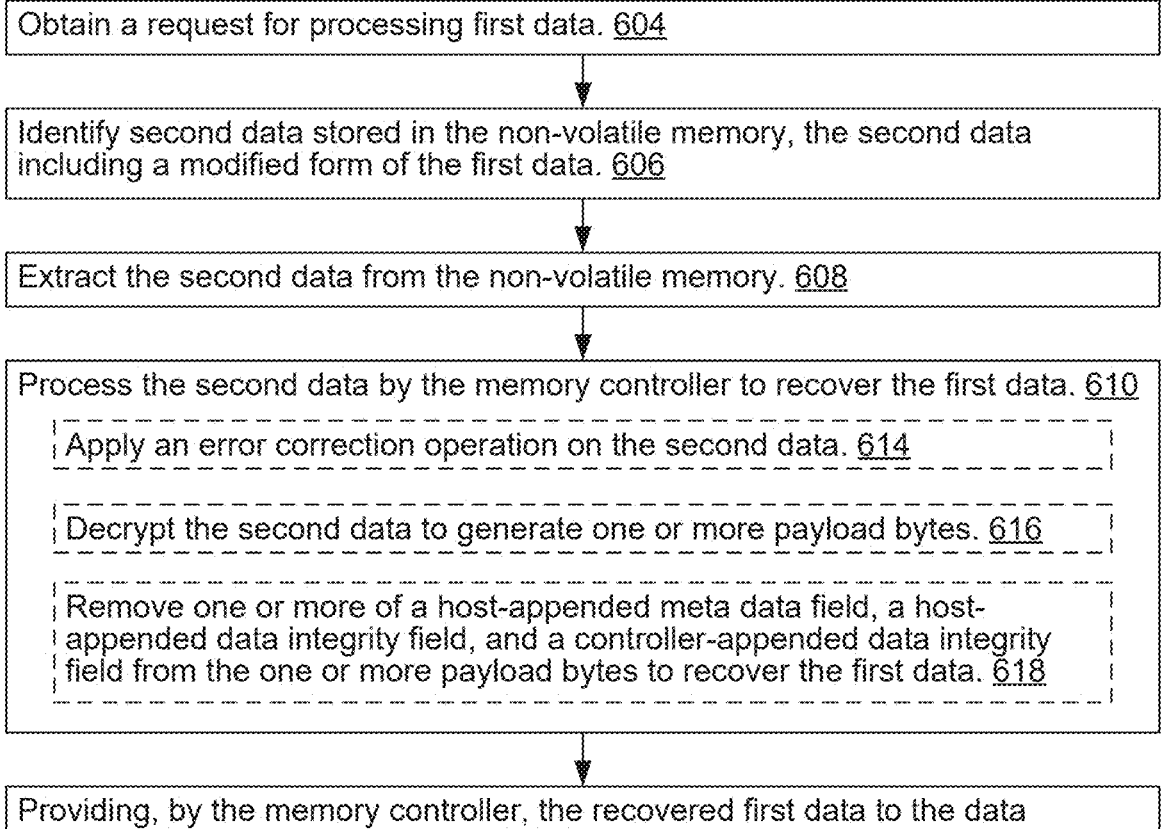

At a memory system including a data processor, a memory controller, and a non-volatile memory, the memory system configured to couple to a host device: 602

Obtain a request for processing first data. 604

Identify second data stored in the non-volatile memory, the second data including a modified form of the first data. 606

Extract the second data from the non-volatile memory. 608

Process the second data by the memory controller to recover the first data. 610

Apply an error correction operation on the second data. 614

Decrypt the second data to generate one or more payload bytes. 616

Remove one or more of a host-appended meta data field, a host-appended data integrity field, and a controller-appended data integrity field from the one or more payload bytes to recover the first data. 618

Providing, by the memory controller, the recovered first data to the data processor for further processing within the memory system. 612

The data processor is configured to process the recovered first data and is distinct from the memory controller, and the memory controller is configured to write data into, read data from, and manage data storage within, the memory system. 620

Figure 6

DEVICE INTERNAL DATA PREPARATION AND MIGRATION

TECHNICAL FIELD

This application relates generally to resource management in a memory system including, but not limited to, methods, systems, and non-transitory computer-readable media for utilizing on-memory processing resources efficiently to store data and process data locally in the memory system.

BACKGROUND

Memory is applied in a computer system to store instructions and data. The data are processed by one or more processors of the computer system according to the instructions stored in the memory. Multiple memory units are used in different portions of the computer system to serve different functions. Specifically, the computer system includes non-volatile memory that acts as secondary memory to keep data stored thereon if the computer system is decoupled from a power source. Examples of the secondary memory include, but are not limited to, hard disk drives (HDDs) and solid-state drives (SSDs). The secondary memory relies on a memory controller to manage its memory space and process read, write, and read-modify-write requests from a host device efficiently with low latency.

SUMMARY

Various embodiments of this application are directed to methods, systems, devices, non-transitory computer-readable media for utilizing a data transformation capability of a memory controller to provide data to an internal processor (also called a data processor) of a memory system for further on-memory data processing. The memory system includes data paths used to transfer user data extracted from a non-volatile memory to a host device coupled to the memory system. In addition to these data paths, a loopback system is incorporated into the memory system to route such user data to the internal processor. The loopback system is configured to respond to one of a host command and an internal operation and restore the user data extracted from the non-volatile memory to an original form. In some embodiments, the data paths used to transfer the user data to the host device are at least partially reused to form the user data in the memory system. As such, on-memory processing is enabled for the memory system efficiently without repeating the data transformation capability of the memory controller in the internal processor of the memory system.

In some implementations, a data transfer mechanism is created locally in the memory system, and configured to reformat user data extracted from the non-volatile memory of the memory system for both internal and external memory destinations (e.g., corresponding to dynamic random-access memory (DRAM) units in the memory system and in the host device). Further, in some embodiments, an inline decryption module is applied to decrypt the user data extracted from the non-volatile memory. Alternatively, in some embodiments, an integrity check module checks the user data extracted from the non-volatile memory and removes data integrity fields. Alternatively, the user data extracted from the non-volatile memory includes host appended data integrity and meta data fields, which are removed during data formatting.

In one aspect, a method is implemented at a memory system (e.g., solid-state drives) to process storage data. The memory system includes a data processor, a memory controller, and a non-volatile memory, and is configured to couple to a host device. The method includes obtaining a request for processing first data and identifying second data stored in the non-volatile memory. The second data includes a modified form of the first data. The method further includes extracting the second data from the non-volatile memory, processing the second data by the memory controller to recover the first data, and providing, by the memory controller, the recovered first data to the data processor for further processing within the memory system.

In some embodiments, the memory system further includes a first memory and a second memory. The method further includes storing the second data extracted from the non-volatile memory in the first memory temporarily, obtaining by the memory controller the second data from the first memory, and storing the recovered first data in the second memory temporarily. The recovered first data are provided by the memory controller to the data processor by way of the second memory. In an example, the non-volatile memory includes NAND flash memory, and the first memory and the second memory correspond to two distinct dynamic random-access memory (DRAM) units. In another example, the first memory includes static random access memory (SRAM), and the second memory includes DRAM.

In another aspect, some implementations include a memory system or a memory device (e.g., SSDs) that includes a memory controller, a data processor distinct from the memory controller, a non-volatile memory coupled to the memory controller, and memory having instructions stored thereon for performing any of the above methods of storage data processing.

In yet another aspect, some implementations include a non-transitory computer readable storage medium storing one or more programs. The one or more programs include instructions, which when executed by a memory system (e.g., solid-state drives) cause the memory system to implement any of the above methods to efficiently process stored data.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 2 is a block diagram of a memory system of an example electronic device having one or more memory access queues, in accordance with some embodiments.

FIG. 6 is a flow diagram of an example method for storage data processing, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with storage capabilities.

Figure 1:
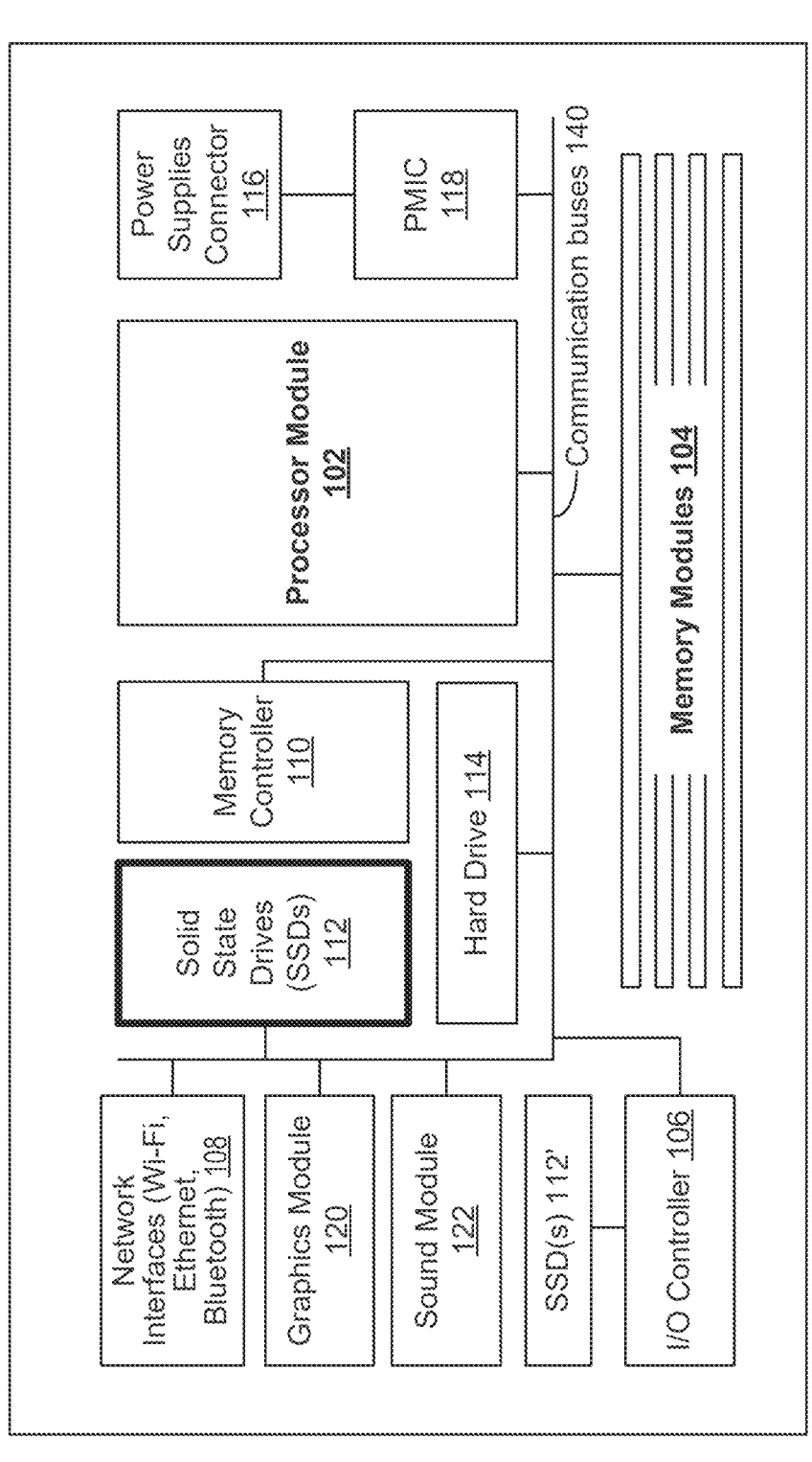
FIG. 1 is a block diagram of an example system module in a typical electronic device in accordance with some embodiments.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a trackpad) via a universal serial bus interface. In some embodiments, the network interfaces 108 includes one or more interfaces for Wi-Fi, Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as static random-access memory (SRAM), double data rate (DDR) dynamic random-access memory (DRAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, SSD(s) 112, an HDD 114, power management integrated circuit (PMIC) 118, a graphics module 120, and a sound module 122. The memory controller 110 is configured to control communication between the processor module 102 and memory components, including the memory modules 104, in the electronic system. The SSD(s) 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. The graphics module 120 is configured to generate a feed of output images to one or more display devices according to their desirable image/video formats. The sound module 122 is configured to facilitate the input and output of audio signals to and from the electronic system under control of computer programs.

Alternatively or additionally, in some embodiments, the system module 100 further includes SSD(s) 112' coupled to the I/O controller 106 directly. Conversely, the SSDs 112 are coupled to the communication buses 140. In an example, the communication buses 140 operates in compliance with Peripheral Component Interconnect Express (PCIe or PCI-E), which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104, SSD(s) 112 or 112', and HDD 114. These new non-transitory computer readable storage media include, but are not limited to, those manufactured from biological materials, nanowires, carbon nanotubes and individual molecules, even though the respective data storage technologies are currently under development and yet to be commercialized.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 includes one or more memory devices 240 (e.g., SSD(s)). Each memory device 240 further includes a controller 202 and a plurality of memory channels 204 (e.g., channel 204A, 204B, and 204N). Each memory channel 204 includes a plurality of memory cells. The controller 202 is configured to execute firmware level software to bridge the plurality of memory channels 204 to the host device 220. In some embodiments, each memory device 240 is formed on a printed circuit board (PCB).

Each memory channel 204 includes one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory device 240 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory device 240 stores information of an ordered list of superblocks in a cache of the memory device 240. In some embodiments, the cache is managed by a host driver of the host device 220, and called a host managed cache (HMC).

In some embodiments, the memory device 240 includes a single-level cell (SLC) NAND flash memory chip, and each memory cell stores a single data bit. In some embodiments, the memory device 240 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory device 240 corresponds to a single queue 216 of memory access requests. Each memory access request is optionally received internally from the memory device 240 to manage the respective memory channel 204 or externally from the host device 220 to write or read data stored in the respective channel 204. Specifically, each memory access request includes one of: a system write request that is received from the memory device 240 to write to the respective memory channel 204, a system read request that is received from the memory device 240 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller 202 to implement internal memory management functions including, but are not limited to, garbage collection, wear levelling, read disturb mitigation, memory snapshot capturing, memory mirroring, caching, and memory sparing.

In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228A that is included in memory device 240, e.g., by way of the DRAM controller 226. Alternatively, in some embodiments, the local memory processor 218 stores data to be written into, or read from, each memory block in the plurality of memory channels 204 in a DRAM buffer 228B that is main memory used by the processor module 102 (FIG. 1). The local memory processor 218 of the controller 202 accesses the DRAM buffer 228B via the host interface controller 222.

In some embodiments, data in the plurality of memory channels 204 is grouped into coding blocks, and each coding block is called a codeword. For example, each codeword includes n bits among which k bits correspond to user data and (n-k) corresponds to integrity data of the user data, where k and n are positive integers. In some embodiments, the memory device 240 includes an integrity engine 230 (e.g., an LDPC engine) and registers 232, which include a plurality of registers or SRAM cells or flip-flops and are coupled to the integrity engine 230. The integrity engine 230 is coupled to the memory channels 204 via the channel controllers 214 and SRAM buffer 224. Specifically, in some embodiments, the integrity engine 250 has data path connections to the SRAM buffer 224, which is further connected to the channel controllers 214 via data paths that are controlled by the local memory processor 218. The integrity engine 230 is configured to verify data integrity and correct bit errors for each coding block of the memory channels 204.

In some embodiments, the memory system 200 includes an SSD having an L2P address indirection table 250 that stores physical addresses for a set of logical addresses, e.g., a logical block address (LBA). In some embodiments, the L2P address indirection table 250 is stored in an L2P table cache 212 included in the controller 202. Alternatively, in some embodiments, the memory system 200 includes a DRAM module 228A, and the L2P address indirection table 250 is stored in the DRAM module 228A. The local memory processor 218 of the controller 202 accesses the DRAM module 228A via a DRAM controller 226.

Figure 3:
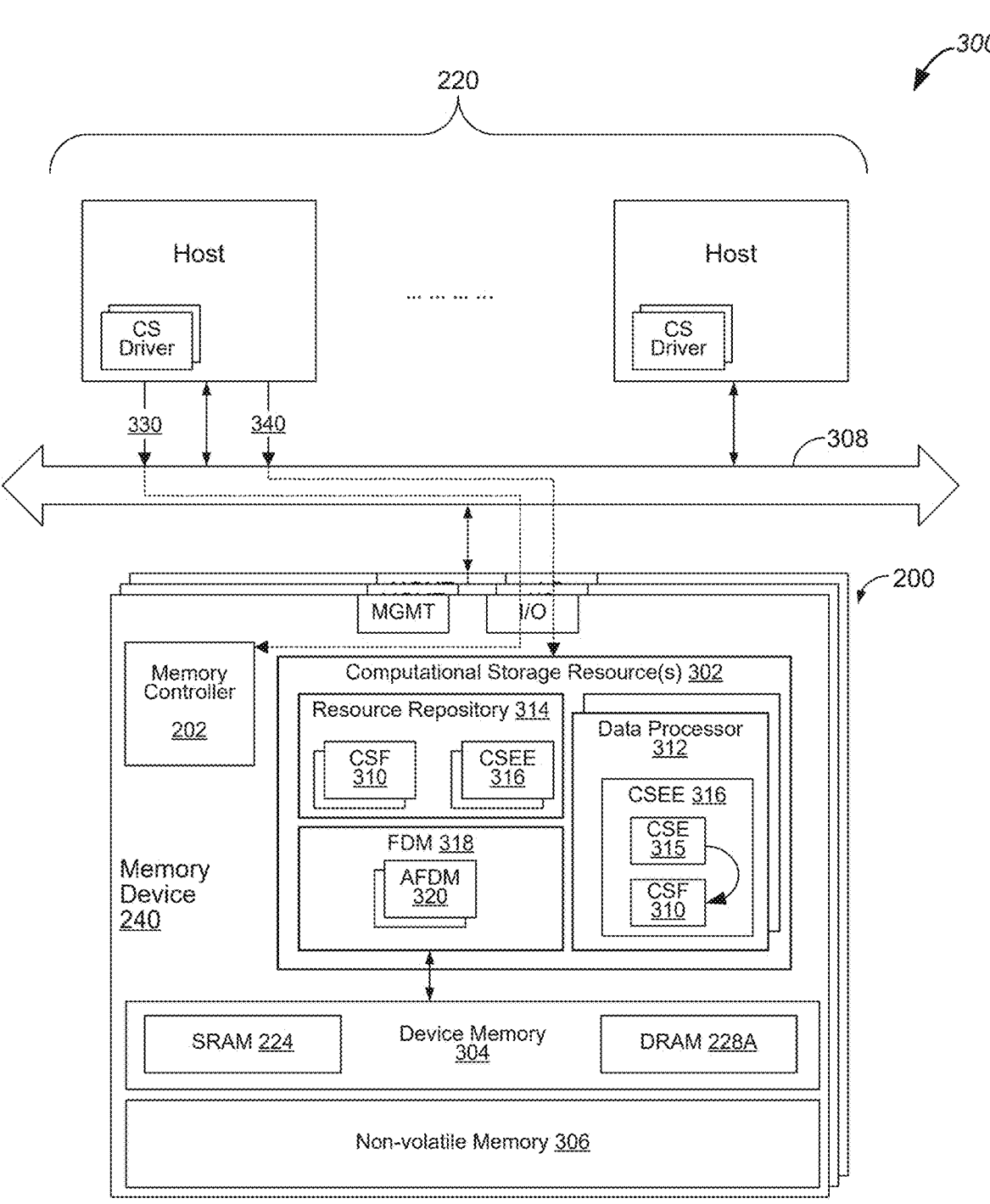
FIG. 3 is a block diagram of an example computer system that includes a memory system having an internal processing capability, in accordance with some embodiments.

FIG. 3 is a block diagram of an example computer system 300 that includes a memory system 200 having an internal processing capability, in accordance with some embodiments. The memory system 200 is also called a computational storage drive (CSD), and includes one or more memory devices 240 (e.g., SSDs). Each memory device 240 further includes a memory controller 202, a device memory 304, and a non-volatile memory 306 (e.g., memory channels 204). The host device(s) 220 and the one or more memory devices 240 of the memory system 200 are coupled to each other via a communication fabric 308. The communication fabric 308 includes a communication bus 140 (FIG. 1) that operates in compliance with a data bus standard, e.g., Peripheral Component Interconnect Express (PCIe), Ethernet standards. The host device(s) 220 are configured to issue memory access requests to write data into, and read data from, the non-volatile memory 306. The memory controller 202 accesses the non-volatile memory 306 in response to the memory access operations. Additionally, in some embodiments, the memory controller 202 dispatch system read requests (also called background read requests or non-host read requests) and system write requests to implement internal memory management functions including, but are not limited to, garbage collection, wear levelling, read disturb mitigation, memory snapshot capturing, memory mirroring, caching, and memory sparing. The device memory 304 of each memory device 240 further includes one or more of a L2P table cache 212, a SRAM buffer 224, and a DRAM buffer 228A, and is configured to store data temporarily while the memory controller 202 accesses the non-volatile memory 306 for memory accesses or internal memory management.

In some embodiments, the memory controller 202 is dedicated to processing the memory access requests and internal memory management functions. A memory device 240 further includes one or more computational storage resources (CSRs) 302 configured to implement data processing operations locally on the memory device 240. A set of predefined data processing operations are implemented to perform a computational storage function (CSF) 310, which is distinct from the memory accesses and internal memory management functions performed by the memory controller 202. In some embodiments, a computational storage resource 302 processes user data that are received from the host device(s) 220 or extracted from the non-volatile memory 306 during the data processing operations. In some embodiments, the processed data are stored into the non-volatile memory 306 or sent to the host device(s) 220 via the fabric 308. Further, in some embodiments, a subset of the user data, the process data, and intermediate data generated during the data processing operations is temporarily stored in the device memory 304 (e.g., SRAM buffer 224, DRAM buffer 228A).

In some embodiments, the computational storage resource 302 includes one or more data processors 312 and a resource repository 314. The one or more data processors 312 provide a computational storage engine configured to perform one or more predefined data processing operations, e.g., associated with a computational storage function 310 of the computational storage resource 302. In some embodiments, the computational storage function 310 corresponds to an in-memory application associated with the computational storage engine, and is implemented via the computational storage engine in the memory device 240. The resource repository 314 is a centralized location (e.g., memory space) storing various types of data and resources, such as software libraries, configuration files, media files, or any other type of data needed for a plurality of computational storage functions 310 performed by the computational storage resource 302. For example, the resource repository 314 stores instructions for creating a computational storage engine environment (CSEE) 316 and instructions for implementing a set of data processing operations associated with a computational storage function 310 in the CSEE 316. Instructions are loaded from the resource repository 314 and executed by the data processor 312, thereby creating the CSEE 316 where the computational storage engine 315 is executed to implement data processing operations associated with the computational storage function 310.

In some embodiments, the computational storage resource 302 further includes a function data memory (FDM) 318 for storing data that are used or generated by the computational storage engine 315 for performing a computational storage function 310. In some embodiments, the function data memory 318 is included in the device memory 304. For example, the function data memory 318 corresponds to a portion of the DRAM buffer 228A (FIG. 2). In another example, the function data memory 318 corresponds to a portion of the SRAM buffer 224 (FIG. 2). Further, in some embodiments, a portion of the function data memory 318 (also called an allocated FDM (AFDM) 320) is allocated for one or more instances of a computational storage function 310.

In some embodiments, a host device 22 issues a memory read or write request 330 to a memory device 240 of the memory system 200, and the memory controller 202 of the memory device 240 receives the memory read or write request 330 and accesses the non-volatile memory 306 accordingly. Alternatively, in some embodiments, a host device 22 issues a data processing request 340 to the memory device 240, and a data processor 312 of the computational storage resource 302 (e.g., the computational storage engine 315) receives the data processing request 340 and processes user data extracted from the data processing request or the non-volatile memory 306.

Figure 4:
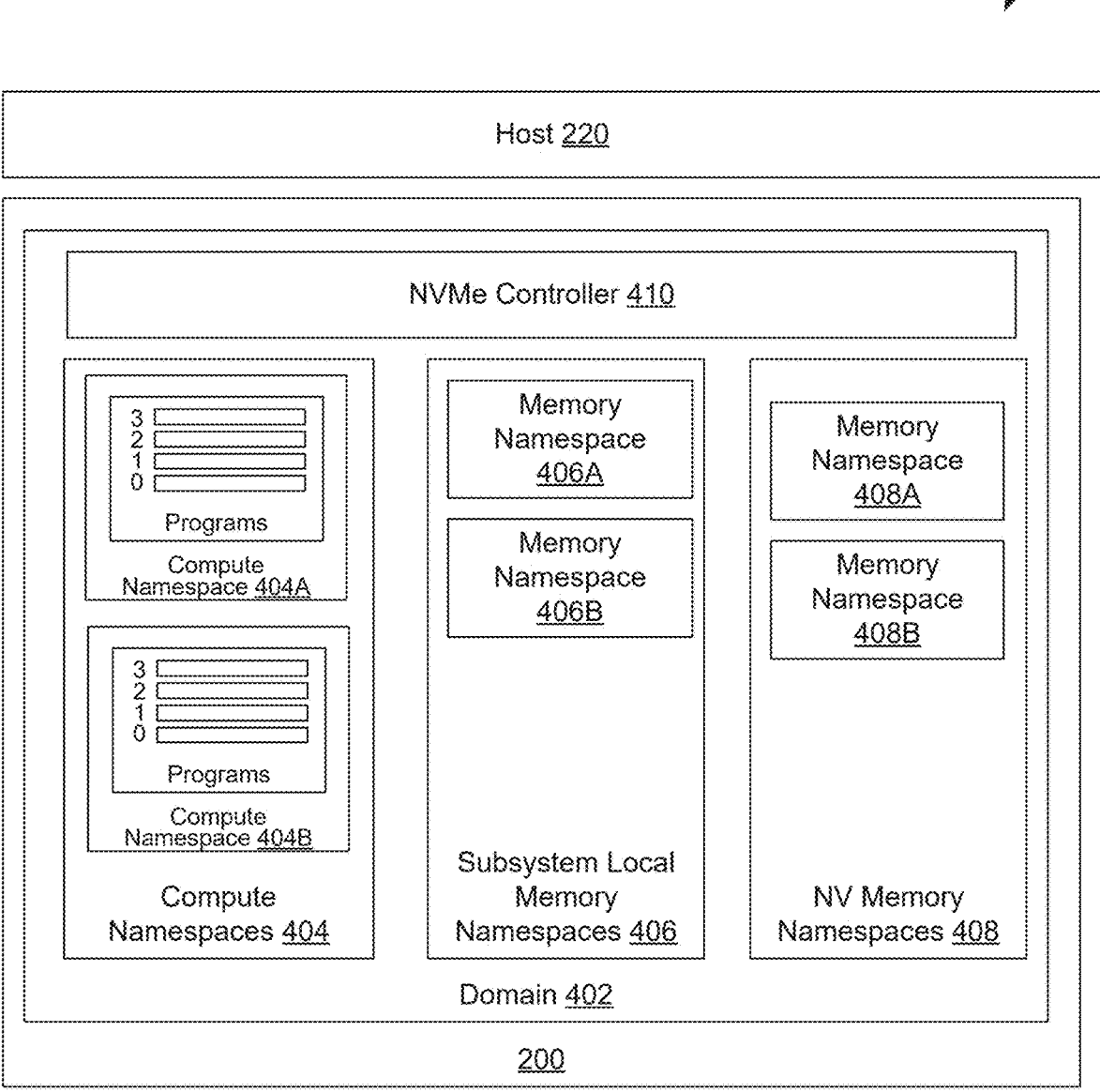
FIG. 4 is a block diagram of an example computer system including a memory system that operates in compliance with a storage access and transport protocol, in accordance with some embodiments.

FIG. 4 is a block diagram of an example computer system 400 including a memory system 200 that operates in compliance with a storage access and transport protocol (e.g., nonvolatile memory express (NVMe)), in accordance with some embodiments. The memory system 200 includes one or more memory devices 240 each of which corresponds to a domain 402 according to the storage access and transport protocol. Each domain 402 corresponding to a respective memory device 240 includes a one or more compute namespace 404, local memory namespaces 406, memory namespaces 408, and a domain controller 410. Each namespace is a collection of LBAs accessible to, or associated with, a respective one of the plurality of programs.

A memory device 240 includes one or more processors having a computation capability (e.g., a memory controller 202, a data processor 312), a device memory 304 (e.g., a cache 212, a SRAM buffer 224, a DRAM buffer 228A), and a non-volatile memory 306. When the memory device 240 executes a plurality of programs, resources of the memory controller 202, the device memory 304, and the non-volatile memory 306 are allocated to implement the plurality of programs based on the storage access and transport protocol (e.g., NVMe). A plurality of compute namespaces 404 (e.g., 404A and 404B) correspond to, are configured to provide, instructions of the plurality of programs executed by the one or more programs of the memory device 240. Resources of the device memory 304 are allocated based on a plurality of local memory namespaces 406 (e.g., 406A and 406B) to facilitate execution of the plurality of programs by the memory device 240, so are resources of the non-volatile memory 306 allocated based on a plurality of memory namespaces 408 (e.g., 408A and 408B). It is noted that, in some embodiments, a number of programs is not limited to 2 and may be greater than 2, thereby creating more than two namespaces in each type of compute namespaces 404, 406, or 408.

In an example, a compute namespace 404A corresponds to a respective local memory namespace 406A and a respective non-volatile memory namespace 408A. The compute namespace 404A provides instructions of a corresponding program for execution by the one or more processors of the memory device 240. In some situations, input data that are processed, and output data that are generated, by these instructions are temporarily stored based on the local memory namespace 406A. In some situations, the input data are extracted based on the non-volatile memory namespace 408A, and the output data are stored based on the non-volatile memory namespace 408A. By these means, namespace allocation and utilization in the domain 402 corresponding to the memory device 240 are managed according to the storage access and transport protocol.

In some embodiments, the storage access and transport protocol includes a NVMe protocol for accessing flash storage (e.g., SSDs) via a PCI Express (PCIe) bus. The PCIe bus is configured to support a plurality of parallel command queues (e.g., on an order of 104 queues), thereby operating with a substantially high throughput and a substantially fast response time. In some embodiments, the host device 220 is configured to communicate and interact with each memory device 240 (e.g., SSD) as a standard NVMe storage device using the NVMe protocol. The host device 220 is configured to read and write data and implement data processing operations on the memory device 240 using NVMe commands.

In some embodiments, the host device 220 uses an operating system (e.g., a Linux operating system), and the CSRs 302 (FIG. 3) of the memory device 240 uses an embedded operating system (e.g., an embedded Linux operating system) that matches the operating system of the host device 220. In some embodiments, the host device 220 uses extended vendor unique commands to control and interact with the embedded operating system of the CSRs 302 of the memory device 240.

Figure 5A:
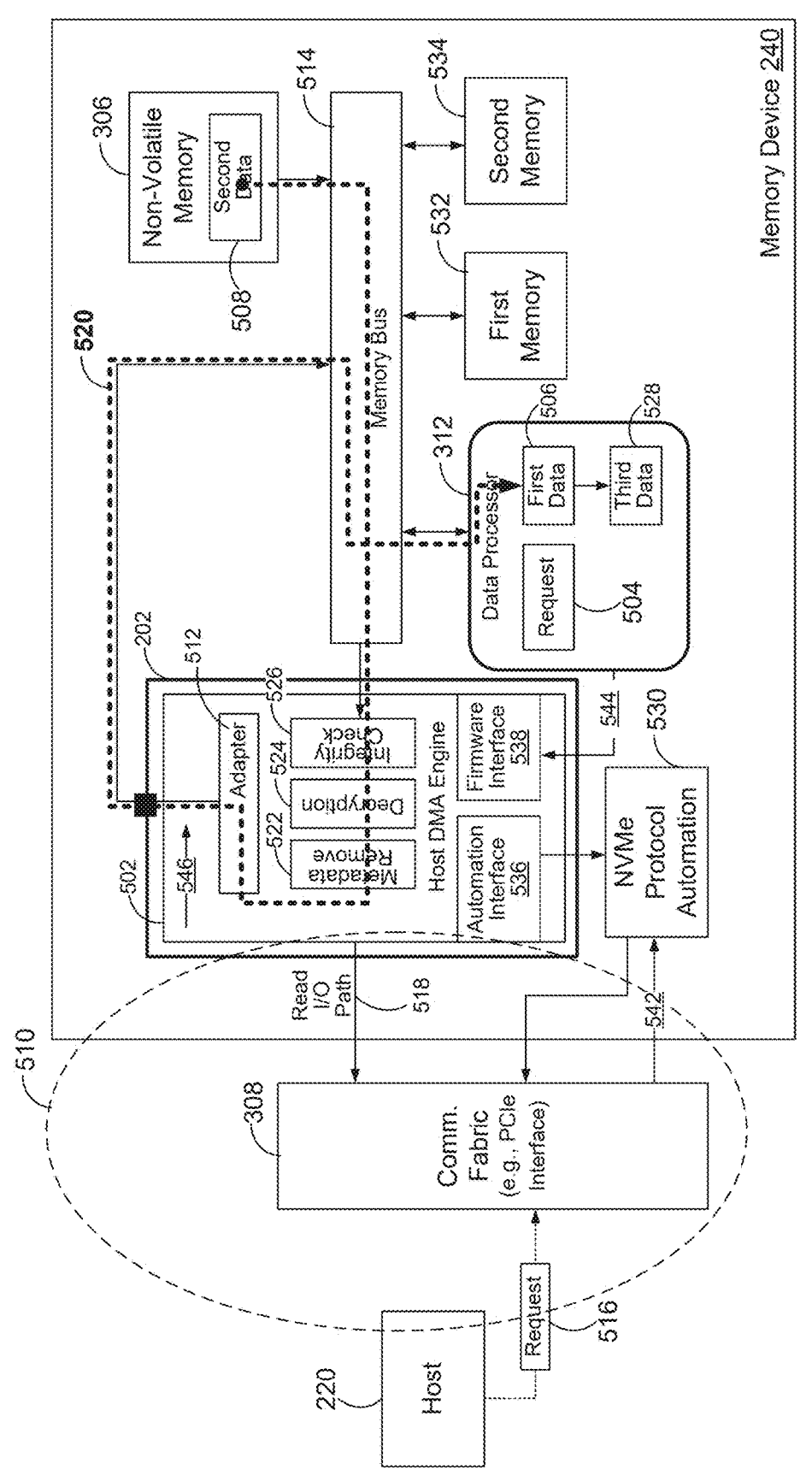
FIG. 5A is a block diagram of an example computer system configured to prepare data for local data processing in a memory device, in accordance with some embodiments.
Figure 5B:
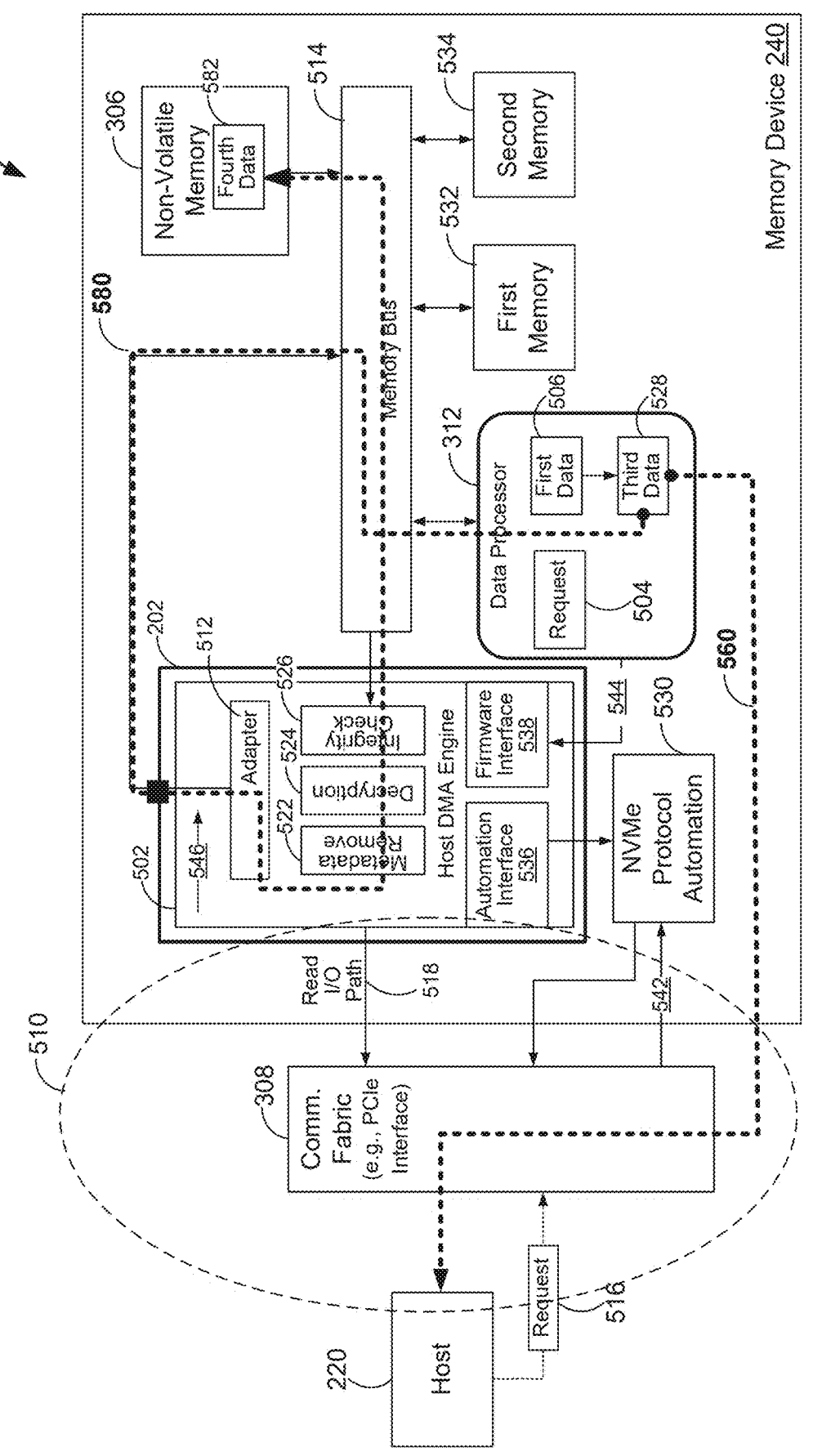
FIG. 5B is a block diagram of an example computer system configured to provide locally processed data, in accordance with some embodiments.

FIG. 5A is a block diagram of an example computer system 500 configured to prepare data for local data processing in a memory device 240, in accordance with some embodiments, and FIG. 5B is a block diagram of the example computer system 500, which is shown in FIG. 5A, further configured to provide locally processed data, in accordance with some embodiments. The computer system 500 includes a host device 220 and a memory device 240 coupled to the host device 220 via a communication fabric 308 (FIG. 3). The communication fabric 308 includes a communication bus 140 (FIG. 1) that operates in compliance with a data bus standard, e.g., PCIe and Ethernet standards. The memory device 240 further includes at least a memory controller 202 and a non-volatile memory 306. The memory controller 202 is configured to process memory access requests received from the host device 220 and perform internal memory management functions (e.g., garbage collection, wear levelling, read disturb mitigation, memory snapshot capturing, memory mirroring, caching, memory sparing, etc.).

In some embodiments, the memory device 240 further includes a data processor 312 distinct from the memory controller 202 including a direct memory access (DMA) engine 502. In some embodiments, the memory device 240 includes a plurality of processing units. A first subset of processing units is allocated to the memory controller 202, and a second subset of processing units is allocated to the data processor 312. Stated another way, the memory controller 202 and the data processor 312 may be seamlessly integrated in the plurality of processing units. In some embodiments, the data processor 312 and the memory controller 202 are physically distinct from each other, e.g., packaged in two distinct semiconductor modules.

In various implementations of this application, the memory device 240 obtains a request 504 for processing first data 506, and identifies second data 508 stored in the non-volatile memory 306. The second data 508 includes a modified form of the first data 506. For example, the second data 508 includes an encrypted form of the first data 506 or an original form the first data 506 appended with associated integrity data or metadata. The second data 508 is extracted from the non-volatile memory 306, e.g., by a media controller (not shown). The memory controller 202 (specifically, the DMA engine 502) processes the second data 508 to recover the first data 506, and provides the recovered first data 506 to the data processor 312 for further processing within the memory device 240. Stated another way, in some embodiments, the data processor 312 may utilize data extraction capabilities of the memory controller 202 to obtain the first data, e.g., without having its own data extraction capabilities or communicating with the host device 220.

In some embodiments, the memory controller 202 is coupled to the host device 220 via a data interface 510 including the communication fabric 308. For example, the communication fabric 308 may include an NVMe read input/output data path 518 accessing the memory controller 202 in compliance with PCIe. The memory controller 202 further includes a data adapter 512 coupled at an output of the memory controller 202. The memory device 240 further includes a memory bus 514 to which the memory controller 202, the data processor 312, and the non-volatile memory 306 are coupled. Further, in some embodiments, the data adapter 512 of the memory controller 202 selects the memory bus 514, and outputs the recovered first data 506 via the memory bus 514. The data processor 312 obtains the recovered first data 506 via the memory bus 514.

Further, in some embodiments, the memory controller 202 obtains a data access request 516 made by the host device 220. In response to the data access request 516, the data adapter 512 of the memory controller 202 selects the data interface 510. The recovered first data 507 is provided to the host device 220 via the data interface 510. The data interface 510 includes the communication fabric 308. In an example, the data interface 510 may include the read input/output data path 518 accessing the memory controller 202 in compliance with PCIe. In other words, the memory controller 202 is coupled to the host device 220 and the data processor 312 via the data interface 510 and the memory bus 514, respectively, and is configured to select one of the data interface 510 and the memory bus 514 as a data destination.

More specifically, in some embodiments, the data adapter 512 enables a data transfer engine that corresponds to two destination paths, which include an external destination path and an internal destination path. In some embodiments, the external destination path is routed to a host device 220 through a PCI transport layer. In an example, the external destination path includes an NVMe read input and output data path 518. Conversely, in some embodiments, the internal destination path (also called a computer data path) is coupled to the memory controller 202 and extended to the non-volatile memory through the memory bus 514. In some embodiments, the internal destination path includes a separate physical interface coupled to the data transfer engine. In some embodiments, the internal destination path is configured to deliver plain text data to a data processor 312 of the memory device 240.

In some embodiments, the DMA engine 502 of the memory controller 202 includes one or more of a metadata removal module 522, a decryption module 524, and an integrity check module 526. The metadata removal module 522, the decryption module 524, and the integrity check module 526 are also applied to implement the inherent memory access functions and internal memory management functions of the memory controller 202. The decryption module 524 is configured to decrypt the second data 508 extracted from the non-volatile memory 306 to generate one or more payload bytes. In some embodiments, the second data 508 include the first data 506 and integrity data associated with the first data 506. The integrity check module 526 is configured to verify validity of the second data 508 and apply an error correction operation on the second data 508. After data validation, the first data 506 is extracted from the second data 508. Further, in some embodiments, the second data 508 may be encrypted, and is decrypted to generate the one or more payload bytes, which are further validated, and corrected if needed, to provide the first data 506. The metadata removal module 522 is configured to remove one or more of a host-appended metadata field, a host-appended data integrity field, and a controller-appended data integrity field from the second data 508 to recover the first data 506. In an example, the host-appended data integrity field corresponds to a cyclic redundancy check (CRC) bit. In some embodiments, the second data 508 may be encrypted, and is decrypted to generate the one or more payload bytes, which are further validated, corrected if needed, and separated from one or more appended fields to provide the first data 506.

It is noted that, in some embodiments, the second data 508 are transferred along a data path 520 (FIG. 5A) that originates from the non-volatile memory 306, passes the memory bus 514, extends to the memory controller 202, passes the memory bus 514 once again, and arrives at the data processor 312, and the second data 508 is transformed to the first data 506 in the memory controller 202. As such, the data processor 312 take advantages of inherent memory access capabilities of the memory controller 202 to extract the second data 508 from the non-volatile memory 306 and recover the original first data 508 from the second data 508, without duplicating associated data pre-processing functions modules.

Referring to FIG. 5B, in some embodiments, the data processor 312 generates third data 528 from the recovered first data 506 and provides the third data 528 to the host device 220 (e.g., along a first data return path 560 including the communication fabric 308). Specifically, a computational storage engine 315 is executed in the data processor 312 and implements a computational storage function 310 including processing the recovered first data 506. This computational storage function 310 is distinct from a memory access function (e.g., memory read, memory write) or a memory management function configured to be implemented by the memory controller 202. Alternatively, in some embodiments, the data processor 312 generates third data 528 from the recovered first data 506. The third data 528 is transferred along a second data return path 580, and stored in the non-volatile memory 306, e.g., in a transformed format. The second data return path 580 may be reverse to the data path 520. In an example, the second data return path 580 originates from the data processor 312, passes the memory bus 514, extends to the memory controller 202, passes the memory bus 514 once again, and arrives at the non-volatile memory 306. The third data 528 may be transformed (e.g., supplemented with metadata and/or integrity data, encrypted) in the memory controller 202 to generate fourth data 582, which is stored in the non-volatile memory 306. During this data transfer, the third data 538 (transformed or not) may be stored in the first memory 532 or the second memory 534 temporarily.

In an example, the computational storage function 310 is associated with application of a machine learning model. Model parameters (e.g., weights and biases) and input data are extracted from the non-volatile memory, recovered in the memory controller 202, and processed to generate an output (e.g., the third data 528) based on the machine learning model. The output (e.g., the third data 528) may be provided to the host device 220 via the first data return path 560 including the communication fabric 308. Alternatively, the output (e.g., the third data 528) may be sent to the non-volatile memory 306 via the second data return path 580 or stored in the non-volatile memory 306.

In some embodiments, the memory device 240 further includes a first memory 532 and a second memory 534. The second data 508 extracted from the non-volatile memory 306 is stored in the first memory 532 temporarily. The memory controller 202 obtains the second data 508 from the first memory 532. The recovered first data 506 is stored in the second memory 534 temporarily, and further provided to the data processor 312. Stated another way, the memory controller 202 provides the recovered first data 506 to the data processor 312 by way of the second memory 534. In some embodiments, the non-volatile memory 306 includes NAND flash memory. Alternatively, in some embodiments, the non-volatile memory 306 is not limited to NAND flash memory, and may be any type of storage media that retain stored information independently of whether power is removed. In some embodiments, the DRAM buffer 228A of the memory device 240 (FIG. 2) includes the first memory 532 and the second memory 534. The first memory 532 includes a first DRAM unit, and the second memory 534 includes a second DRAM unit. Alternatively, in some embodiments, one of the first memory 532 and the second memory 534 is included in the SRAM buffer 224, and the other of the first memory 532 and the second memory 534 is included in the DRAM buffer 228A. For example, the first memory 532 is included in the SRAM buffer 224, storing the second data 508 or associated payload bytes decrypted from the second data 508 to be used by the metadata removal module 522, the decryption module 524, or the integrity check module 526 of the memory controller 202.

Further, in some embodiments, the first memory 532 or the second memory 534 may include a media format buffer associated with the non-volatile memory 306. The first memory 532 or the second memory 534 may include a host format buffer for temporarily storing data that are associated with the host device 220. The media format buffer may be automatically transformed to the host format buffer for storing user data (e.g., first data 506, second data 508) to be processed by the memory system. In some embodiments, an interface is enabled for a firmware to communicate destination addresses of the user data in a predefined format. An example of the predefined format is a scatter gather list format, which includes a data structure, used to describe a data space. The data space can be a data source space or a data target space. SGL (Scatter Gather List) is a List including one or more SGL Segment, and each SGL Segment is constructed by one or more SGL Descriptor.

In some embodiments, one of a host interface automation command 542, a controller firmware instruction 544, and an internal self-contained operation instruction 546 is obtained, e.g., by the memory controller 202, and the recovered first data 506 are provided to the data processor 312 in response to the one of the host interface automation command 542, the controller firmware instruction 544, and the internal self-contained operation instruction 546. In some embodiments, the memory device 240 includes a NVMe protocol automation module 530, and the DMA engine 502 includes an automation interface 536. The host interface automation command 542 is received from the host device 220 by the NVMe protocol automation module 530 and provided to the DMA engine 502 of the memory controller 202 via the automation interface 536. Alternatively, in some embodiments, the DMA engine 502 includes a firmware interface 538 and receives the controller firmware instruction 544 from the data processor 312 via the firmware interface 538. Alternatively, in some embodiments, the internal self-contained operation instruction 546 is generated by the DMA engine 502 to implement a memory access function inherent to the memory controller 202. By these means, data formatting can be initiated and configured via host interface automation or controller firmware (e.g., for self-contained operations) in a flexible manner.

In some embodiments, the request 504 for processing the first data 506 is received from the host device 220 (e.g., based on a data access request 516), and includes a host direct memory access (DMA) input output (IO) command. The host DMA IO command further includes a destination address, of the first data 506, provided by the host device 220. The memory controller 202 determines a physical address of the first data 506 in the non-volatile memory based on the destination address of the first data 506. The second data is extracted from the non-volatile memory 306 based on the physical address of the first data 506. Further, in some embodiments, the request 504 received from the host device 220 is processed by the memory controller 202 to identify a logic address of the first data 506, and the memory controller 202 checks an L2P address indirection table 250 (FIG. 2) to determine the physical address of the first data 506.

Conversely, in some embodiments, a firmware program controls the memory controller 202 to provide the first data 506 to the data processor 312 though a register (e.g., the second memory 534) or a queue interface (e.g., a firmware interface 538). The firmware program provides the destination address of the first data 506, and the memory controller 202 directly initiates a loopback transfer of the first data 506. In some embodiments, the data processor 312 implements a computational storage function 310 (FIG. 3), and generates a request 504 for processing the first data 506 (e.g., weights of a neural network layer) locally in the data processor 312. The request 504 for processing the first data 506 includes a request for accessing the first data 506 having a destination address in the non-volatile memory 306. The data processor 312 sends the request 504 to the memory controller 202 via a register or queue interface of the data processor 312, e.g., via a firmware interface 538, which supports control of addresses for accessing different types of memories (e.g., non-volatile memory 306, first memory 532, and second memory 534). The memory controller 202 determines a physical address of the first data 506 in the non-volatile memory 306 based on the destination address of the first data 506, e.g., using the L2P address indirection table 250 (FIG. 2), and extracts the second data from the non-volatile memory 306 based on the physical address of the first data 506. In some embodiments, the destination address of the first data 506 is communicated in a scatter gather list format between the memory controller 202 and the data processor 312. The scatter/gather list format includes an array having a number of elements in the array. Each element of the array provides a length and a starting physical address of a physically contiguous scatter/gather region.

In some embodiments, each of the data processor 312, the memory controller 202, and the non-volatile memory 306 includes a distinct respective substrate, and respective substrates of the data processor 312, the memory controller 202, and the non-volatile memory 306 are assembled in a single semiconductor package. Alternatively, in some embodiments, each of the data processor 312, the memory controller 202, and the non-volatile memory 306 is packaged separately in a respective semiconductor package, and respective semiconductor packages are assembled on a single printed circuit board. Alternatively, in some embodiments, the data processor 312 and the non-volatile memory 306 are integrated on a first substrate that is further assembled in a semiconductor package. The memory controller is formed on a second substrate, and the second substrate is assembled in the same semiconductor package or in a distinct semiconductor package.

FIG. 6 is a flow diagram of an example method 600 for storage data processing, in accordance with some embodiments. The method 600 is implemented at a memory system (e.g., a memory system 200 in FIG. 2). The memory system includes (operation 602) a data processor 312, a memory controller 202, and a non-volatile memory 306, and is configured to couple to a host device 220. The memory system obtains (operation 604) a request 504 for processing first data 506, and identifies (operation 606) second data 508 stored in the non-volatile memory 306. The second data 508 includes a modified form of the first data 506. The second data 508 are extracted (operation 608) from the non-volatile memory 306. The memory controller 202 processes (operation 610) the second data 508 to recover the first data 506. The memory controller 202 provides (operation 612) the recovered first data 506 to the data processor 312 for further processing within the memory system 200.

In some embodiments, the memory system further includes a first memory 532 and a second memory 534 (FIG. 5). The second data 508 extracted from the non-volatile memory 306 are stored in the first memory 532 temporarily.

The memory controller 202 obtains the second data 508 from the first memory 532, and stores the recovered first data 506 in the second memory 534 temporarily. The recovered first data 506 are provided by the memory controller 202 to the data processor 312 by way of the second memory 534. Further, in some embodiments, the non-volatile memory 306 includes NAND flash memory. The first memory 532 includes static random access memory (SRAM) (e.g., a SRAM buffer 224 in FIG. 2), and the second memory 534 includes dynamic random-access memory (DRAM) (e.g., in a DRAM buffer 228A in FIG. 2). Alternatively, in some embodiments, the non-volatile memory 306 includes NAND flash memory. The first memory 532 includes a first DRAM unit (e.g., in a DRAM buffer 228A), and the second memory 534 includes a second DRAM unit (e.g., in a DRAM buffer 228A).

In some embodiments, the memory controller 202 applies (operation 614) an error correction operation on the second data 508, decrypts (operation 616) the second data 508 to generate one or more payload bytes, or removes (operation 618) one or more of a host-appended meta data field, a host-appended data integrity field, and a controller-appended data integrity field from the one or more payload bytes to recover the first data 506.

In some embodiments, the data processor 312 generates third data 528 from the recovered first data 506 and provides the third data 528 to the host device 220.

In some embodiments, the data processor 312 is configured to process (operation 620) the recovered first data 506 and is distinct from the memory controller 202, and the memory controller 202 is configured to write data into, read data from, and manage data storage within, the memory system 200.

In some embodiments, the memory controller 202 is coupled to the host device 220 via a data interface 510 (e.g., including an NVMe read input/output data path 518), and further includes a data adapter 512 (FIG. 5) coupled at an output of the memory controller 202. The memory system further includes a memory bus 514 to which the memory controller 202, the data processor 312, and the non-volatile memory 306 are coupled. Further, in some embodiments, the data adapter 512 selects the memory bus 514 and outputs the recovered first data 506 via the memory bus 514. The data processor 312 obtains the recovered first data 506 via the memory bus 514. Alternatively, in some embodiments, the memory controller 202 obtains a data access request 516 made by the host device 220. In response to the data access request 516, the data adapter 512 of the memory controller 202 selects the data interface 510 and provides the recovered first data 506 to the host device 220 via the data interface 510. In an example, the data interface 510 is configured to comply with Peripheral Component Interconnect Express (PCIe).

In some embodiments, the memory controller 202 obtains one of a host interface automation command 542, a controller firmware instruction 544, and an internal self-contained operation instruction 546 (FIG. 5). The recovered first data 506 are provided to the data processor 312 in response to the one of the host interface automation command 542, the controller firmware instruction 544, and the internal self-contained operation instruction 546.

In some embodiments, the request 504 for processing the first data 506 is received from the host device 220 and includes a host direct memory access (DMA) input output (IO) command, and the host DMA IO command further includes a destination address of the first data 506. The memory system determines a physical address of the first data 506 in the non-volatile memory 306 based on the destination address of the first data 506. The second data 508 is extracted from the non-volatile memory 306 based on the physical address of the first data 506.

In some embodiments, the data processor 312 generates the request 504 for processing the first data 506. The request 504 for processing the first data 506 includes a request 504 for accessing the first data 506 having a destination address in the non-volatile memory 306. The data processor 312 sends, to the memory controller 202, the request 504 for accessing the first data 506 via a register or queue interface of the data processor 312. The memory controller 202 determines a physical address of the first data 506 in the non-volatile memory 306 based on the destination address of the first data 506. The second data 508 is extracted from the non-volatile memory 306 based on the physical address of the first data 506.

In some embodiments, each of the data processor 312, the memory controller 202, and the non-volatile memory 306 includes a distinct respective substrate, and respective substrates of the data processor 312, the memory controller 202, and the non-volatile memory 306 are assembled in a semiconductor package.

In some embodiments, the data processor 312 and the non-volatile memory 306 are integrated on a first substrate that is further assembled in a semiconductor package.

Some implementations of this application are directed to creating an internal data path to utilize a memory controller 202 of a memory device to recover modified data (e.g., second data 508) and feed recovered data (e.g., first data 506) to a data processor locally in the memory device 240. In accordance with at least some embodiments disclosed herein is the realization that user data to be stored in a data storage device undergo multiple transformations before being stored on a non-volatile memory 306. These transformations (e.g., encryption) change a layout and size of source bytes of the user data compared to an original form of the user data. In some embodiments, data transformations occur in-line with a data transfer between the host device 220 to the memory controller 202, and the user data are stored, in a modified form, in a volatile memory (e.g., DRAM buffer 228A, SRAM buffer 224) and a non-volatile memory 306 coupled to the memory controller 202. Further, in some embodiments of this application, the user data having a modified device 220 is recovered by the memory controller 202, and provided to the data processor 312 located internally in the memory device 240, thereby facilitating a computational storage function 310 that uses the user data having an original form (e.g., the first data 506). The data processor 312 uses a sequence of bytes in the original form for processing, which may be implemented in the host device 220 as an alternative. In accordance with at least some embodiments user data extracted from a non-volatile memory 306 may be pre-processed (e.g., decrypted, corrected, partitioned) in a memory controller 202, temporarily stored in a volatile memory, and further processed by the data processor 312, thereby effectively reducing power consumption, host-memory communication, and latencies for the data processing operations implemented by the data processor 312.

In accordance with at least some embodiments disclosed herein is the realization that an ad hoc multistep process may apply separate hardware/software modules to process user data in a memory device 240 in an inefficient manner. For example, the ad hoc multistep process includes creating a copy of user bytes, e.g., skipping externally or internally applied protection information and metadata, redirection of select parts of the media data to separate memory address (es), disabling data encryption to avoid requirement for decryption when loading data, application of decryption algorithm, which may include the loading and unwrapping of keys under the direction of firmware, and additional DMA or copy operation to relocate user data to compute engine accessible buffer(s). In some embodiments, the user data are transferred to the host device 220 via a host interface and returned to the memory device 240 to complete the associated data processing operations. Conversely, in some implementations of this application, the data processor 312 take advantages of inherent memory access capabilities of the memory controller 202 to extract the second data 508 from the non-volatile memory 306 and recover the original first data 508 from the second data 508, without duplicating associated data pre-processing functions modules within the data processor 312.

Memory is also used to store instructions and data associated with the method 600, and includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 600.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for storage data processing, comprising:
at a memory system including a data processor, a memory controller, and a non-volatile memory:
    obtaining a request for processing first data;
    identifying second data stored in the non-volatile memory, the second data including a modified form of the first data;
    extracting the second data from the non-volatile memory;
    processing the second data by the memory controller to recover the first data; and
    providing, by the memory controller, the recovered first data to the data processor for further processing within the memory system.

2. The method of claim 1, wherein the memory system further includes a first memory and a second memory, the method further comprising:
    storing the second data extracted from the non-volatile memory in the first memory temporarily;
    obtaining, by the memory controller, the second data from the first memory;
    storing the recovered first data in the second memory temporarily, wherein the recovered first data are provided by the memory controller to the data processor by way of the second memory.

3. The method of claim 2, wherein the non-volatile memory includes NAND flash memory, and the first memory includes static random access memory (SRAM), and wherein the second memory includes dynamic random-access memory (DRAM).

4. The method of claim 2, wherein the non-volatile memory includes NAND flash memory, and wherein the first memory includes a first DRAM unit, and the second memory includes a second DRAM unit.

5. The method of claim 1, wherein processing the second data by the memory controller further comprising one or more of:

applying an error correction operation on the second data;

decrypting the second data to generate one or more payload bytes; and removing one or more of a host-appended meta data field, a host-appended data integrity field, and a controller-appended data integrity field from the one or more payload bytes to recover the first data.

6. The method of claim 1, further comprising:

generating, by the data processor, third data from the recovered first data; and providing the third data to a host device coupled to the memory system.

7. The method of claim 1, wherein the data processor is configured to process the recovered first data and is distinct from the memory controller, and the memory controller is configured to write data into, read data from, and manage data storage within, the memory system.

8. The method of claim 1, wherein:

the memory controller is coupled to a host device via a data interface, and further includes a data adapter coupled at an output of the memory controller; and the memory system further includes a memory bus to which the memory controller, the data processor, and the non-volatile memory are coupled.

9. The method of claim 8, wherein providing the recovered first data further comprises, at the memory controller:

selecting by the data adapter the memory bus; and outputting the recovered first data via the memory bus, wherein the data processor obtains the recovered first data via the memory bus.

10. The method of claim 8, further comprising:

obtaining, by the memory controller, a data access request made by a host device coupled to the memory system; and in response to the data access request:

selecting the data interface by the data adapter of the memory controller; and providing the recovered first data to the host device via the data interface.

11. The method of claim 8, wherein the data interface is configured to comply with Peripheral Component Interconnect Express (PCIe).

12. The method of claim 1, further comprising:

obtaining one of a host interface automation command, a controller firmware instruction, and an internal self-contained operation instruction, wherein the recovered first data are provided to the data processor in response to the one of the host interface automation command, the controller firmware instruction, and the internal self-contained operation instruction.

13. The method of claim 1, wherein the request for processing the first data is received from a host device distinct from the memory system, and includes a host direct memory access (DMA) input output (IO) command, and the host DMA IO command further includes a destination address of the first data, further comprising:

determining a physical address of the first data in the non-volatile memory based on the destination address of the first data, wherein the second data is extracted from the non-volatile memory based on the physical address of the first data.

14. The method of claim 1, further comprising:

generating the request for processing the first data by the data processor, wherein the request for processing the first data includes a request for accessing the first data having a destination address in the non-volatile memory;

sending, to the memory controller, the request for accessing the first data via a register or queue interface of the data processor; and determining a physical address of the first data in the non-volatile memory based on the destination address of the first data, wherein the second data is extracted from the non-volatile memory based on the physical address of the first data.

15. The method of claim 1, wherein each of the data processor, the memory controller, and the non-volatile memory includes a distinct respective substrate, and respective substrates of the data processor, the memory controller, and the non-volatile memory are assembled in a semiconductor package.

16. The method of claim 1, wherein the data processor and the non-volatile memory are integrated on a first substrate that is further assembled in a semiconductor package.

17. The method of claim 1, wherein the memory system includes a plurality of processing units including a first subset of processing units and a second subset of processing units, and wherein the first subset of processing units is allocated to act as the memory controller, and the second subset of processing units is allocated to act as the data processor.

18. The method of claim 1, further comprising:

generating, by the data processor, third data from the recovered first data;

transforming the third data by the memory controller to generate fourth data; and storing the fourth data in non-volatile memory.

19. A memory system, comprising:

a memory controller;

a data processor distinct from the memory controller;

a non-volatile memory coupled to the memory controller; and memory having instructions stored thereon for:

obtaining a request for processing first data;

identifying second data stored in the non-volatile memory, the second data including a modified form of the first data;

extracting the second data from the non-volatile memory;

processing the second data by the memory controller to recover the first data; and providing, by the memory controller, the recovered first data to the data processor for further processing within the memory system.

20. A non-transitory computer-readable storage medium, having instructions stored thereon, which when executed by a memory system cause the memory system to:

at the memory system including a data processor, a memory controller, and a non-volatile memory:

obtain a request for processing first data;

identify second data stored in the non-volatile memory, the second data including a modified form of the first data;

extract the second data from the non-volatile memory;

process the second data by the memory controller to recover the first data; and provide, by the memory controller, the recovered first data to the data processor for further processing within the memory system.

* * * * *